United States Patent [19]
Tarazi

[11] 3,861,895

[45] Jan. 21, 1975

[54] METHOD FOR REDUCING SMOKE AND DUST IN THE PROCESS FOR MANUFACTURING MINERAL WOOL

[75] Inventor: John H. Tarazi, Pasadena, Calif.

[73] Assignee: Arthur C. Withrow Company, Los Angeles, Calif.

[22] Filed: Oct. 19, 1972

[21] Appl. No.: 299,099

Related U.S. Application Data

[62] Division of Ser. No. 133,756, April 13, 1971, abandoned.

[52] U.S. Cl. ............... 65/3, 65/8, 117/126 R, 117/126 GQ
[51] Int. Cl. ............... C03b 19/04, C03c 25/02
[58] Field of Search ....... 117/126 R, 126 GQ; 65/3, 65/8

[56] References Cited
UNITED STATES PATENTS

| | | | |
|---|---|---|---|
| 2,846,348 | 8/1958 | Marzocchi | 65/3 |
| 3,556,754 | 1/1971 | Marsden | 65/3 |
| 3,725,021 | 4/1973 | Trout | 117/126 GQ |

Primary Examiner—William D. Martin
Assistant Examiner—William H. Schmidt
Attorney, Agent, or Firm—Lilling & Siegel

[57] ABSTRACT

Mineral wool fibres still hot from being formed by high speed centrifugation are coated with a composition comprising 1 to 30% of a non-ionic surfactant and 70 to 99% of a polyalkylene glycol having a viscosity in the range of 35 to 180,000 cs. at 100°F. As a result, smoke and dust is reduced, the fibres are annealed and a wetting action is imparted. The preferred surfactants are alkyl phenoxy polyethoxy ethanols.

6 Claims, No Drawings

METHOD FOR REDUCING SMOKE AND DUST IN THE PROCESS FOR MANUFACTURING MINERAL WOOL

CROSS REFERENCE TO RELATED APPLICATION

This application is a division of application Ser. No. 133,756, filed Apr. 13, 1971 now abandoned.

This invention relates to mineral wool, and more particularly to a composition for application to mineral wool during its manufacture to reduce air pollution, and to the method of making the mineral wool.

The term "mineral wool" is used generically to denote various types of mineral fibers which are used extensively as insulation against both sound and fluctuations in temperature. The various types of mineral wool include glass wool, slag wool, rock wool, and the like. These mineral fibers can be made by several methods from the raw materials such as glass, slag, rock, and other fusible raw materials. In the manufacture of glass wool, for example, individual fibers are made from a single source of liquid material, the fibers or filament being drawn from individual orifices. Another method of making mineral wool involves the disintegration of a molten stream of the raw material simultaneously into several thousand fibers. Conventionally, the molten stream is subjected to the action of a steam blast which shreds the stream into minute droplets which are drawn out into fiber form by the force of the blast. In still another method, the stream of molten material is projected onto the peripheral surface of one or more rotors rotating at high speed, the rotors serving to break up the stream into droplets and to draw them into fibrous form. Various types of apparatus are used for making mineral wool in the practice of the so-called centrifugal methods. These apparatus are all well known in the art and need not be described herein. It should be clearly understood, however, that the practice of the instant invention is compatible with all conventional systems of manufacturing mineral wool and, in particular, the centrifugal systems.

It is well known in the art that in the manufacture of mineral wool a great amount of dust is formed which can have harmful effects. The first and most obvious of these harmful effects is the physiological harm caused to the workers in the plant. The workers are highly susceptible to the development of respiratory disorders and, in particular, silicosis. Notwithstanding the seriousness of the harm caused to the workers in the mineral wool manufacturing plants, extensive and irreparable harm is caused to the area surrounding the plant. Enormous amounts of mineral dust are emitted from the mineral wool factories thereby polluting the surrounding atmosphere in a large radius from the plant. The residents of the area are subjected to respiratory disorders and to various dermatological problems caused by the irritating effect of the dust. Furthermore, the dust is pervasive and difficult to remove by ordinary sweeping or dusting methods. But, even worse, the dust has an extremely harmful effect on the other plant and animal life within a wide radius of the factory. Thus, a great ecological imbalance can result. Contributing to the ecological imbalance is the fact that the dust settles into, and pollutes, natural waterways and acts as a screen for useful solar rays. In effect, the dust prevents the useful interchange of heat and other solar radiation thereby changing, still more, the ecological conditions.

In an attempt to cure the problem of dusting caused by the manufacture of mineral wool, mineral oil has been extensively used.

Mineral wool has long been treated with mineral oil, for the purpose of settling the dust. Mineral oil has proven itself to be satisfactory for dust settling, but when a sufficient amount of the oil (say from 4 to 15% by weight) is used the highly combustible character of the mineral oil renders the product itself combustible in the sense that the oil burns on the mineral wool fibers, without, of course, actually burning the fibers. Due to the highly combustible characteristic of mineral oil it has been responsible for numerous costly and dangerous fires in the production and in the shipment of the treated wool. This fire hazard is chiefly due to the fact that lumps of incandescent coke and lava are often projected from the furnace or cupola into the settling chamber wherein the wool is deposited and these hot lumps vaporize the oil and often ignite it, sometimes causing dangerous explosions.

More important, however, is the fact that while mineral oil settles the dust, the oil itself causes vast amounts of smoke emissions from the plant. When the oil contacts the hot mineral a portion of the same decomposes to sulfur and nitrogen-containing compounds which vaporize and are emitted from the stacks with unburned hydrocarbons. The resulting smoke pollutes the air, water and vegetation for miles around the plant.

Another objection is that unmodified mineral oil is quite liquid. While this free flowing characteristic is undoubtedly valuable in the use of the oil as a lubricant when the oil is used in the mineral wool, its liquidity permits the oil to seep out of mineral wool fibers or settle at the bottom of a mineral wool mass or unit to such an extent as to render the treated material unsatisfactory for the demands of the trade. Furthermore when the oil is used in sufficient quantities it causes the treated mineral wool to be heavy and wet or soggy. The mineral wool is not desired by the trade in this condition because of its physical condition, and for the further reason that the product will not insulate as much area as a lighter and drier product. There are a number of other objections to the employment of mineral oil such as, for instance, its tendency to float on water. This tendency of course permits water to rise in the mineral wool which can result in mildew and other related problems.

Numerous attempts have been made to find a substance for this purpose which is more satisfactory than mineral oil. Men highly skilled in the art attempted to use aluminum stearate and a mixture of aluminum stearate and talc, but the resultant mineral wool product proved to be too heavy and soggy to be generally accepted by the trade. Other attempts have been made to use zinc stearate, rosins, synthetic resins and other materials as a substitute for mineral oil but none of these substances proved to be entirely satisfactory. Zinc stearate, for instance, renders the resultant product heavy and soggy. The rosins and synthetic resins are unduly expensive and when mixed with the mineral wool are apparently unstable, and the resultant material soon becomes dusty to an objectionable degree.

Others have attempted to solve the problem from a different angle and have tried to change or modify the undesirable characteristics of the mineral oil by mixing waxes, asphalts, sodium silicate, and numerous other substances with the mineral oil, but insofar as is known by the applicant, none of these attempts to modify the mineral oil has heretofore been successful. As mentioned above, an extremely important disadvantage, in the use of mineral oil is the fact that when mineral oils, which are petroleum lubricating oils, are used an excessive amount of smoke is emitted from the factory thereby further adding to the pollution problems.

Accordingly, it is an object of the present invention to provide a treatment for mineral wool, and in particular rock wool, which is free of the aforementioned and other such disadvantages.

It is a primary object of the present invention to provide a composition for the treatment of rock wool during the manufacture thereof to eliminate the smoke created by the high speed centrifuge used to spin the molten rock.

It is another primary object of the present invention to provide a method for making rock wool without the excessive production of rock wool dust.

It is a further object of the present invention to provide a composition for treating rock wool during the manufacture thereof which will anneal the fiber during the spinning.

It is yet another object of the present invention to provide a composition for application to rock wool during the manufacture thereof to impart a wetting action to the wool thereby enabling the manufacturer to machine compact the same and bale it in a reasonable weight per unit volume.

It is still another object of the present invention to provide a method of making rock wool with a low dust level, a long fiber length, and a low smoke level.

It is a further object of the present invention, consistant with the foregoing objects, to provide a method of making rock wool and a composition for treating rock wool which substantially eliminates environmental pollution caused by the manufacture of rock wool.

Further objects of the present invention will become apparent as the description thereof proceeds.

It should be clearly understood that the present invention is drawn to the treatment of mineral wool of all types during the manufacture thereof. The invention will be described with reference to the preferred embodiment, namely, the manufacture of rock wool, with the clear understanding that it is equally applicable to the manufacture of glass wool, slag wool, and the like. In the practice of the present invention, the rock wool is manufactured according to well-known methods and with well-known apparatus. In these prior art methods and apparatus, the mineral oil, or other additives, are injected through a plurality of orifices by the pressure of high temperature steam. Various methods and means are known for providing the necessary atomizing effect. Representative of the numerous prior art methods and apparatus is U.S. Pat. No. 2,944,284, granted on July 12, 1960 to Wesley T. Tillotson et al.

In the present invention, a composition of a polyalkylene glycol having a viscosity in the range of from about 35 to about 180,000 centistokes at 100°F. and a nonionic surfactant is applied to the hot rock wool. The preferred nonionic surfactant is an alkylphenoxy polyethoxy ethanol. The polyalkylene glycol is present in the composition in the range of from 70 to 99% by weight and the nonionic surfactant is present in the range of from 30 to 1% by weight. The composition is mixed with water for application to the rock wool in an amount of from 1 to 99% by weight, the water then being present in an amount of from 99% to 1% by weight. The inventive composition is then applied to the rock wool during its manufacture in the same manner that mineral oil has been applied in the prior art. Furthermore, the inventive composition is compatible with other additives generally used in the manufacture of rock wool and can be mixed with the same. Such other additives include resinous binding materials, germacides, fungicides, and the like.

The polyalkylene glycols used in the composition of the instant invention have the general formula

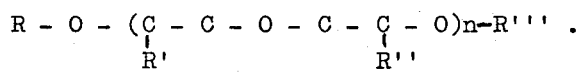

The molecular size of the polymer can vary to provide a broad range of viscosities, the viscosity of the particular polyalkylene glycol being an indication of its molecular weight. As is well-known in the art, the polyalkylene glycol is synthesized to represent essentially a single molecular type with a characteristic bell-shaped spread in molecular weight. Thus, a particular molecular weight, or viscosity, is, in fact, indicative of a range. It is obvious the variations in the molecular structure are possible by changes in the R entities. If all four R's represent hydrogen, the product will be polyethylene glycol. If R and R''' represent hydrogen, but R' and R'' are methyl groups, the product will be polypropylene glycol. Additionally, products from mixtures of ethylene and propylene oxide are available where R may represent hydrogen or an alkyl hydrocarbon group such as methyl-, ethyl-, or butyl-. Typical polyalkylene glycols useful in the instant invention are the "Polyol WL" series manufactured by Jefferson Chemical Company, Inc., such as WL-1400, WL-3500, and WL-14400, having viscosities at a 100° F. of 306, 754, and 2554 centistokes, respectively. Polyol WL-1400 has a molecular weight of 2400 and Polyol WL-3500 has a molecular weight of 4300. Other typically useful polyalkylene glycols for the instant invention are the polyethylene glycols and polypropylene glycols of Dow Chemical Company. These materials, known as the "Polyglycol" series are designated in their name by molecular weight, such as polyglycols E400, E600, P400, and the like. In each instance, "E" represents the polyethylene glycol and "P" represents the polypropylene glycol with the numerical suffix representing the molecular weight. These polyglycols have viscosities of 49, 72, and 35.2 centistokes, respectively, at 100° F. Further useful materials are Dow's "polyglycol 13-20,000" which is a diol derived from ethylene and propylene oxides, having a viscosity of 590 centistokes, in a 50% water solution, at 100° F., and Union Carbide's UCON polyglycols.

The nonionic surfactant can be any one of the commercially available nonionic surfactants known in the art, with the preferred nonionic surfactant being the alkylphenoxy polyethoxy ethanols. These materials, also, are well-known in the art and are commercially available.

The useful nonionic surface-active agents have the general structure

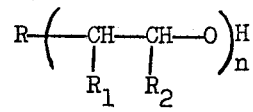

wherein $R_1$ and $R_2$ are hydrogen or short chain alkyl, where n is an integer greater than 3, and where R is a residue of a compound of a monomeric organic compound having an active hydrogen, e.g. alcohols, phenols, amides, primary amines, secondary amines, carboxylic acids, etc. These nonionic detergents are well known (note U.S. Pat. No. 1,970,578 and U.S. Pat. No. 2,213,477) and may be typified by the polyalkylene oxide derivatives (i.e. polyethylene oxide, polypropylene oxide, polybutylene oxide) of water-insoluble higher fatty acids, such as lauric, oleic, palmitic and stearic acid and the like of mixtures thereof, such as the mixtures of fatty acids obtained from animal and vegetable fats and oils or by oxidation of petroleum fractions such as paraffin wax. They may also be exemplified by the polyalkylene oxide derivatives of such water-insoluble organic hydroxy compounds as higher aliphatic alcohols (i.e. the alcohols corresponding to the fatty acids specified above or mixtures thereof), oil or phenols, particularly alkyl phenols containing at least six alkyl carbon atoms such as isooctyl-, di-tertiary butyl-, triisopropyl-, nonyl-, dodecyl-, octadecyl-, phenols or naphthols, or of higher alkyl alcohols, such as benzyl alcohol, cinnamyl alcohol. They may also be exemplified by the polyalkylene oxide derivatives of such amines as stearyl, lauryl, dicyclohexyl, dibutyl amine and the like. A particularly useful nonionic detergent is that obtained by condensing one mol of tall oil with 5 to 15 mols of ethylene oxide.

Compositions were made according to the prior art and according to the instant invention and applied to rock wool through a plurality of orifices by high pressure steam. The compositions and results are given below.

EXAMPLE 1

A petroleum oil was prepared as follows:

85% Petroleum oil 100 SSU 1100°F.
12% Sodium sulfonate
3% Coupling agent hexylene glycol

100%

See Table 1 for results.

EXAMPLE 2

30.0% Tall oil fatty acid
6.0% Caustic potash
55.0% Water
4.0% Isopropyl alcohol
5.0% Sodium salt EDTA chelating agent 100.0%

This formula is biodegradable liquid soap. It was mixed at various percentages with water and applied as described. The result was a considerable reduction in smoke at a mixture of 20% in water, but the length of the fiber was reduced to 40% of the normal; and the dust increased to approximately 30% of normal. See Table 1 for results.

EXAMPLE 3

99.0% by weight propylene glycol
1.0% by weight alkylphenoxy polyethoxy ethanol nonionic surfactant 100.0%

See Table 1 for results

EXAMPLE 4

98% by weight hexylene glycol
2% by weight surfactant Example 3

100%

See Table for results

EXAMPLE 5

95% by weight polyalkylene glycol with a viscosity at 100°F. 49 to 230 CS
5% by weight surfactant Example 3

100%

See Table 1 for results

EXAMPLE 6

95% by weight polyalkylene glycol viscosity at 100°F. 3,000 to 180,000 CS
5% by weight surfactant Example 3%

100%

See Table 1 for results

TABLE 1

| Example | % Mix in Water | Fiber Length | Smoke Level | Dust Level |
| --- | --- | --- | --- | --- |
| 1 | 25 | 5 | 4 | 5 |
| 1 | 10 | 3 | 6 | 3 |
| 2 | 50 | 4 | 4 | 4 |
| 2 | 25 | 4 | 4 | 6 |
| 3 | 50 | 9 | 10 | 0 |
| 3 | 25 | 9 | 10 | 0 |
| 3 | 10 | 7 | 10 | 0 |
| 4 | 50 | 4 | 10 | 2 |
| 4 | 25 | 4 | 10 | 3 |
| 5 | 25 | 7 | 10 | 8 |
| 5 | 10 | 7 | 10 | 8 |
| 6 | 25 | 10 | 10 | 10 |
| 6 | 15 | 10 | 10 | 10 |
| 6 | 5 | 5 | 10 | 8 |

TABLE 2

| Scale No. | Product Fiber | Smoke | Dust |
| --- | --- | --- | --- |
| 10 | Long Fiber | No Smoke | No Dust |
| 9 | | | |
| 8 | | | |
| 7 | | | |
| 6 | | | |
| 5 | | | |
| 4 | | | |
| 3 | | | |
| 3 | | | |
| 1 | Very Short | | |
| 0 | No Fiber | High Smoke | High Dust |

Inspection Methods

Smoke — Visual inspection from stacks
Dust — Visual inspection around the machines and in the receivers chambers
Fiber — Length of fiber is measurable Thus, it can be seen that the results obtained by the use of polyalkylene glycols are superior to those obtained by the use of a mineral oil and, furthermore, the higher viscosity polyalkylene glycols are the preferred materials.

It should be apparent from the foregoing detailed description, that the objects set forth hereinabove have been successfully achieved. Moreover, while there is shown and described a present preferred embodiment of the invention, it is to be distinctly understood that the invention is not limited thereto, but may be otherwise variously embodied and practiced within the scope of the following claims. Accordingly,

What is claimed is:

1. In a method of making mineral wool by high-speed centrifugation of molten mineral to form initially hot mineral fibres, the fibres then being collected to form the wool, the improvement comprising:
applying to the initially hot mineral wool fibres a treating composition, comprising from 30 to 1% by weight of a non-ionic surfactant, and from 70 to 99% by weight of a polyalkylene glycol having a viscosity in the range of from about 35 to about 180,000 cs. at 100°F, whereby dust generation created during the high temperature centrifugation for forming the mineral fibres from molten mineral is reduced or eliminated substantially without generation of smoke.

2. In a method in accordance with claim 1, wherein the polyalkylene glycol has a viscosity of 3,000 to 180,000 cs. at 100°F.

3. In a method in accordance with claim 1, wherein the treating composition is applied as a water solution comprising from 1 to 99% by weight of the composition and from 99 to 1% by weight of water.

4. In a method in accordance with claim 1, wherein the polyalkylene glycol is selected from the group consisting of polyethylene glycols, polypropylene glycols, and polyalkylene glycols derived from both ethylene oxide and propylene oxide.

5. In a method of making mineral wool by high-speed centrifugation of molten mineral to form initially hot mineral fibres, the fibres then being collected to form the wool, the improvement comprising:
applying to the initially hot mineral wool fibres a treating composition, comprising from 30 to 1% by weight of a non-ionic surfactant, having the general structure

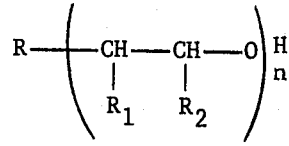

wherein $R_1$ and $R_2$ are selected from the group consisting of hydrogen and short-chain alkyl groups, R is the residue of a monomeric organic compound having an active hydrogen and n is an integer greater than 3, and from 70 to 99% by weight of a polyalkylene glycol having a viscosity in the range of from about 35 to about 180,000 cs. at 100°F, whereby smoke and dust generation created during the high temperature centrifugation for forming the mineral fibres from molten mineral is reduced or eliminated.

6. In a method of making mineral wool by high-speed centrifugation of molten mineral to form initially hot mineral fibres, the fibres then being collected to form the wool, the improvement comprising:
applying to the initially hot mineral wool fibres a treating composition, comprising from 30 to 1% by weight of a non-ionic surfactant selected from the group consisting of alkylphenoxy polyethoxy ethanols, and from 70 to 99% by weight of a polyalkylene glycol having a viscosity in the range of from about 35 to about 180,000 cs. at 100°F, whereby dust generation created during the high temperature centrifugation for forming the mineral fibres from molten mineral is reduced or eliminated substantially without generation of smoke.

* * * * *